United States Patent Office 3,188,294
Patented June 8, 1965

3,188,294
PHOSPHONIUM SALTS, POLYMERS PREPARED THEREFROM AND PROCESSES OF MAKING SAME
Ludwig Maier, Zurich, Switzerland, assignor to Monsanto Company, a corporation of Delaware
No Drawing. Filed Mar. 15, 1961, Ser. No. 152,953
Claims priority, application Switzerland, Mar. 17, 1960, 3,006/60
(Filed under Rule 47(b) and 35 U.S.C. 118)
17 Claims. (Cl. 260—2)

It was found that phosphinimines containing a

group, especially phosphinimines of the general formula $$R_3P=NR'$$

by addition of compounds of acids and metals being at least bivalent, phosphorus, silicon or boron, or of compounds of acids and organic substituted metals being at least bivalent, phosphorus, silicon or boron, give phosphonium salts of a new kind.

In the above formula R signifies an alkyl, cycloalkyl, aralkyl, aryl, oxyl (R"O—), thioxyl (R"S—) or amine (H₂N—, R"HN—, R"₂N—) radical, thereby the three radicals which are attached to the phosphorus atom may be different. More narrowly R is a hydrocarbon, hydrocarbonthio, hydrocarbonoxy or hydrocarbonamino radical having not more than 18 carbon atoms per hydrocarbon group, more preferably not more than 8 carbon atoms. On account of the easier availability the phosphinimines having identical radicals generally are preferred. R' signifies a hydrogen atom, an alkyl, cycloalkyl, aralkyl, aryl, heterocycloalkyl, sulfonyl (R"SO₂—), substituted amine (R"HN—, R"₂N—, R"CONH— etc.) or phosphinimine (R₃P=N—) radical. The radicals R and R' may also contain other substituents such as halogen, NO₂, CN, COOH, COOR", R"HN, R"₂N, R"O, R"S etc. or, particularly when they are cyclic radicals, one or several further phosphinimino groups (R" is a hydrocarbon radical). More narrowly R' is hydrogen, a hydrocarbon radical or a radical of the formula —R"—N=PR₃, more specifically a radical of the formula

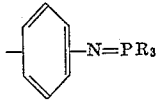

wherein R is as defined hereinabove and R" is a hydrocarbon radical having not more than 18 carbon atoms, preferably not more than 8 carbon atoms.

The choice of phosphinimines which are suitable for carrying out the process of invention is very great. For the illustration the following simple phosphinimines corresponding to the given definition are formulated (C₆H₅)₃P=NH, (C₆H₅)₃P=NC₆H₅, (C₅H₁₁)₃P=NC₆H₅
(C₆H₅)₃P=NC₂H₅, (C₆H₅)₃P=NCH₂C₆H₅
(C₆H₅)₃P=NC₅H₄N, (C₆H₅)₃P=NSO₂C₆H₅
(C₆H₅)₃P=NNHCOC₆H₅, (C₆H₅)₃P=NNHC₁₂H₂₅
(C₃H₇)₃P=NN(C₆H₅)₂, (C₆H₅O)₃P=NSO₂C₆H₅
(C₄H₉S)₃P=NSO₂C₆H₅, (C₆H₅NH)₃P=NC₆H₅, etc.

The preparation of phosphinimines is well-known. For example the compound (C₆H₅)₃P=NH is obtained from [(C₆H₅)₃PNH₂]Cl and NaNH₂ in liquid ammonia (R. Appel and A. Hauss, Angew. Chem. 71, 626, 1959). The preparation of phosphinimines which have a substituted imino group can be achieved by one of the following methods:

(a) From tertiary phosphines and azides $$R_3P+N_3R' \rightarrow R_3P=NR'+N_2$$

(H. Staudinger and J. Meyer, Helv. 2, 635, 1919; 4, 861, 1921).

(b) From tertiary phosphines and chloroamine T

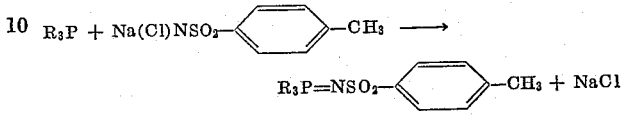

(F. G. Mann and E. J. Chaplin, J. Chem. Soc. 527, 1937).

(c) From sulfonic acid amides and PCl₅ through the intermediate trichlorophosphinimine which can be converted by Grignard compounds into the corresponding phosphinesulfonimides or by alkali phenolates into the corresponding phosphiteimides $$R'SO_2NH_2+PCl_5 \rightarrow R'SO_2N=PCl_3$$
$$+3R'MgX \rightarrow R'SO_2N=PR_3$$
$$R'SO_2NH_2+PCl_5 \rightarrow R'SO_2N=PCl_3$$
$$+3NaOR'' \rightarrow SO_2N=P(OR'')_3$$

(A. V. Kirsanov and Z. D. Nekrasova, C.A. 50, 14631). The corresponding thiophosphites can also be prepared according to this method by using alkali mercaptides.

(d) From O,N-dibenzylhydroxylamine and triphenylphosine

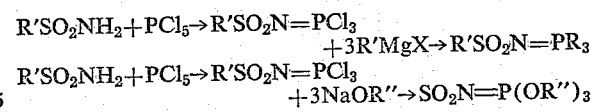

(H. H. Wassermann and R. C. Koch, Chem. & Ind. 1014, 1956).

(e) From triphenylphosphine-dihalides and primary aryl amines $$R_3PCl_2+3H_2NAr \rightarrow R_3P=NAr+2ArNH_2 \cdot HCl$$

(L. Horner and H. Oediger, Ann. 627, 142, 1959). Bisphosphinimines are also accessible according to this method, for example,

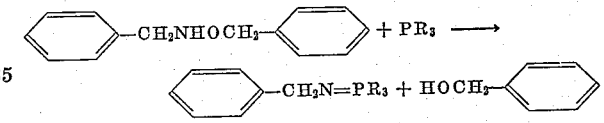

Salts derived from acids and at least bivalent metals which are convenient for the reaction are, for example, the halides of Be, Mg, Ca, Zn, Cd, Hg, Al, Ga, Zr, Ge, Sn, As, Sb, Bi, Te, etc. Instead of the halides can also be used the salts of other acids such as sulfates, nitrates, phosphates, cyanides, cyanates, thiocyanates, chlorates, perchlorates, sulfides, acetates, laurates, oleates etc. so far as these salts are available and have a certain solubility in the reaction mixture. Also included are the corresponding oxychlorides such as AsOCl SbOCl, BiOCl, GeOCl₂, etc. Strongly oxidizing salts which may destroy the phosphinimines are excluded.

Compounds derived from acids and phosphorus, silicon or boron which are suitable for the reaction are, for example PCl₃, PBr₃, PI₃, PF₃, PCl₅, PCl₂F₃, PBr₅, POCl₃, POBr₃, POBrCl₂, PSCl₃, P(CN)₃, P(SCN)₃ etc.; SiCl₄, SiCl₃F, SiBr₄, Si₂Cl₆, SiSBr₂, Si₂OCl₆ etc.; BCl₃, BBr₃, BBrI₂, BI₃ etc. In general, the halides are preferred.

The reaction occurs on principle according to one of the following equations

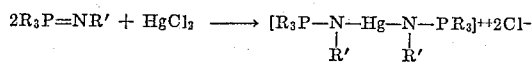

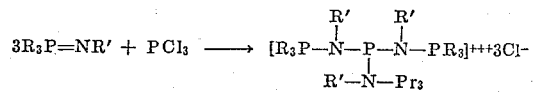

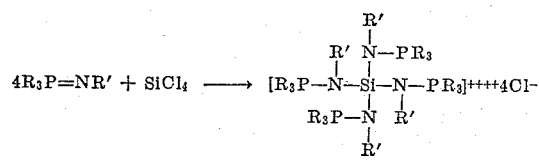

According to the number of reactive halogens or acid radicals respectively present, two or several phosphinimine groups can be linked together in the illustrated manner. But it is clear that for such linkages closer limits often are set by reason of stereometric hindrance and that the introduced metal, phosphorus, silicon or boron may still contain halogen or acid radicals respectively. This is particularly the case when the halides possess less reactive or non-reactive fluorine atoms like, for example, in the compounds $PCl_2F_3$, $SiCl_2F_2$ etc. and/or when the phosphinimine is reacted in an amount which is not equivalent to the reactive halogen atoms:

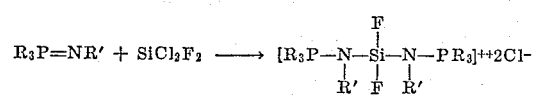

Besides the enumerated salts and compounds the organic derivatives thereof are also suitable to put into practice the invention. These must contain at least one reactive halogen atom or other acid radical. When for the sake of simplicity the polyvalent metals inclusive phosphorus, silicon and boron are defined by the sign M, the following formula can be established for the reactants

In this formula R has the significance as defined before. A may be an oxygen or sulfur atom, X is a halogen atom or possibly an other acid radical, $a$ is zero or an integer, $b$ is zero or 1 and $v$ is the actual valency of the element M, thereby the number $v-a-2b$ must be at least equal to 1. Actual valency means that valency which the element M possesses in the compound to be reacted, for example, $v$ is in $PCl_3$ equal to 3, in $PCl_5$ equal to 5 etc. It is intelligible that the number of possible radicals R and/or X, apart from the valency of the element M, is also limited in special cases through the stability of the compound. The quaternizing agents corresponding to the above formula, which can be reacted with phosphinimines are very numerous.

According as are present in the reactant to be added one or two halogen atoms besides organic substituents, the reaction occurs conformably to one of the following equations

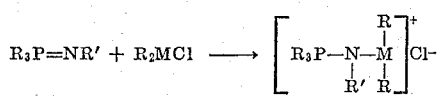

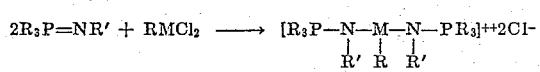

But in the latter case can also be added equimolar amounts of a phosphinimine and an organic metal halide, thereby one of the halogen atoms which is attached to the element M remains

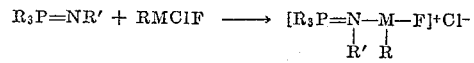

It was mentioned above that in the group $R_3P=NR'$ the radical R', especially when being cyclic, can contain one or several phosphinimine groups $(R_3P=N—)$. Examples of such compounds are

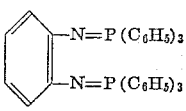 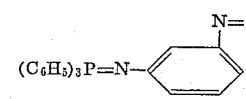

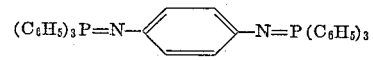

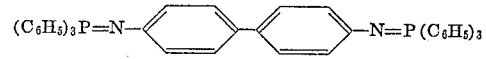

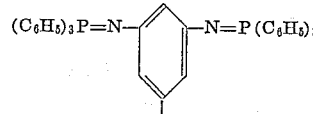

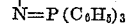

These starting products are obtained, for example, according to the above mentioned method (e) by reacting compounds of the type $R_3PX_2$ with a diamine, triamine etc., especially with a cyclic amine like diamino-benzene, triaminobenzene, diamino-pyridine, melamine etc.

The addition of monofunctional organic metal halides, phosphorus halides, silicon halides or boron halides proceeds according to the usual scheme

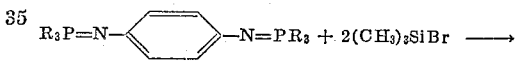

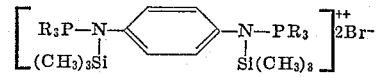

With bifunctional halogen compounds are obtained, according as ring formation will be possible or not, phosphonium salts conformably to the scheme

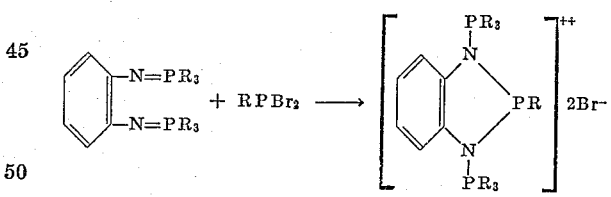

or polymeric phosphonium salts as illustrated by the following scheme

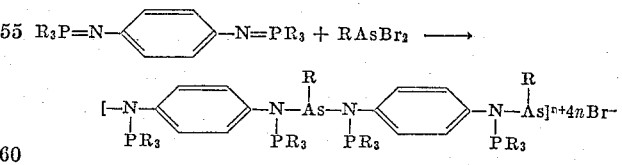

The phosphonium salts of invention can be obtained by simply mixing the reactants. The calculated amount of the reactant to be added is expediently given to a solution of the phosphinimine. Suitable inert solvents are anhydrous benzene, ether, dioxane etc. If need for, one works under exclusion of oxygen. With the reaction of $PCl_3$, $PRCl_2$ etc. the addition of an antioxidizing agent like acetonitrile, nitromethane etc. may possibly be advantageous.

It was further found that complex salts are obtained which in most cases are difficultly soluble when the phosphonium salts are reacted with certain anionic salts. Illustrative examples of such anionic salts are $HgCl_2$, $HgBr_2$, ammonium reineckate, potassium tetraphenylborate, sodium perchlorate, sodium picrate, sodium cyclopentadienyl-tricarbonyl-chromate, potassium chromate, potassium dichromate, potassium ferrocyanide, potassium ferricyanide etc. This conversion possibly can also be carried out in aqueous solution. By treatment with sulfur or selenium some of these phosphonium salts can be transformed into the corresponding sulfur or selenium containing derivatives

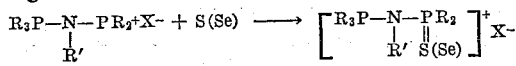

The phosphonium salts of invention can be used as pest controlling agents, textile auxiliaries, means for soil amelioration, disinfectants (bactericides and fungicides), detergents, additives for benzene and oils, means for flameproofing, polymers, ion exchangers etc.

Example 1

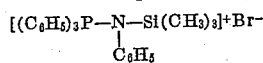

To a solution of 7.2 g. $(C_6H_5)_3P=NC_6H_5$ in 160 ml. of benzene is added dropwise under stirring a solution of 3 g. $BrSi(CH_3)_3$ in 40 ml. of benzene. A white voluminous precipitation falls out. After 16 hours the crude product is filtered off; M.P. 194–195° C. The purification is accomplished by dissolving in ethyl alcohol and precipitating with ether. Yield 8 g. (=78.5% of the theory); M.P. 201–202° C.

Analysis.—$C_{27}H_{29}NPSiBr$:

| | Calcd. | Found |
|---|---|---|
| Percent C | 64.02 | 64.57 |
| Percent H | 5.77 | 5.70 |
| Percent N | 2.76 | 3.07 |
| Percent Br | 15.75 | 15.95 |

Example 2

The complex salt of the compound of Example 1 is prepared with $HgBr_2$:

$[(C_6H_5)_3P\text{—}N\text{—}Si(CH_3)_3]^+[HgBr_3]^-$
$\quad\quad\quad\quad |$
$\quad\quad\quad\quad C_6H_5$ To a solution of 4 g. of the phosphonium salt according to Example 1 in 40 ml. of ethyl alcohol is added dropwise a solution of 2.84 g. $HgBr_2$ in 40 ml. of ethyl alcohol. The precipitation is filtered off and washed with alcohol. Yield 4.9 g. (=71.5% of the theory); M.P. 165–169° C. (146° C. sintering).

Analysis.—$C_{27}H_{29}NPSiHgBr_3$:

| | Calcd. | Found |
|---|---|---|
| Percent Br | 27.66 | 27.31 |
| Percent Hg | 23.14 | 22.7 |

Example 3

The complex salt of the compound of Example 1 is prepared with $Cr(SCN)_4(NH_3)_2$:

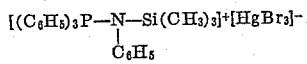

To a solution of 4 g. of the phosphonium salt according to Example 1 in 40 ml. of ethyl alcohol is added dropwise a solution of 2.66 g. $NH_4[Cr(SCN)_4(NH_3)_2]$ in 70 ml. of ethyl alcohol. The pale violet-red precipitation is left stand for 16 hours, then filtered off and washed with ethyl alcohol.

Analysis.—$C_{31}H_{35}PN_7S_4SiCr$:

| | Calcd. | Found |
|---|---|---|
| Percent C | 49.97 | 49.34 |
| Percent H | 4.73 | 4.57 |

Example 4

The complex salt of the compound of Example 1 is prepared with $B(C_6H_5)_4$:

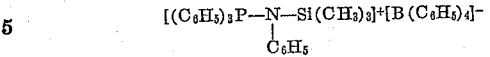

To a solution of 4 g. of the phosphonium salt according to Example 1 in 40 ml. of ethyl alcohol is added dropwise a solution of 2.82 g. $K[B(C_6H_5)_4]$ in 50 ml. of ethyl alcohol. The white precipitation is filtered off after 3 hours; freed from KBr by washing with water and dried. Yield 3.33 g. (=56.5% of the theory); M.P. 182–185° C.

Analysis.—$C_{51}H_{49}PNSiB$:

| | Calcd. | Found |
|---|---|---|
| Percent C | 82.12 | 86.41 |
| Percent H | 6.62 | 6.34 |

Example 5

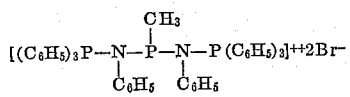

To a solution of 14 g. $(C_6H_5)_3P=NC_6H_5$ in 100 ml. of benzene is added dropwise a solution of 4 g. $CH_3PBr_2$ in 40 ml. of benzene. The precipitation is completed by addition of light petroleum and filtered off. The purification is accomplished by dissolving in ethyl alcohol and precipitating with light petroleum. Yield 12 g. (=67% of the theory); M.P. 196–198° C.

Analysis.—$C_{49}H_{43}N_2P_3Br_2$:

| | Calcd. | Found |
|---|---|---|
| Percent C | 64.48 | 64.61 |
| Percent H | 4.74 | 4.85 |
| Percent N | 3.07 | 2.84 |
| Percent P | 10.18 | 9.97 |
| Percent Br | 17.51 | 17.25 |

Example 6

The complex salt of the compound of Example 5 is prepared with $HgBr_2$:

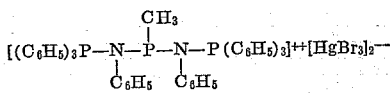

To a solution of 4.56 g. of the phosphonium salt according to Example 5 in 30 ml. of ethyl alcohol is added dropwise a solution of 3.6 g. $HgBr_2$ in 70 ml. of ethyl alcohol. After cooling the reaction mixture a white precipitation forms. Yield 4.8 g. (=49% of the theory).

Analysis.—$C_{49}H_{43}N_2P_3Hg_2Br_6$:

| | Calcd. | Found |
|---|---|---|
| Percent Br | 24.56 | 24.73 |
| Percent Hg | 29.29 | 29.30 |

Example 7

The complex salt of the compound of Example 5 is prepared with $Cr(SCN)_4(NH_3)_2$:

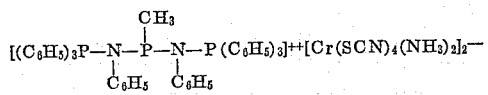

To a solution of 4.56 g. of the phosphonium salt according to Example 5 in 30 ml. of ethyl alcohol is added dropwise a solution of 3.54 g. $NH_4[Cr(SCN)_4(NH_3)_2]$ in 30 ml. of ethyl alcohol. The precipitation which is formed after cooling is filtered off, freed from $NH_4Br$ by washing with water, washed with alcohol and dried. Yield 5.34 g. (=75% of the theory).

Analysis.—$C_{57}H_{55}N_{14}P_3S_8Cr_2$:

|  | Calcd. | Found |
|---|---|---|
| Percent C | 49.26 | 49.18 |
| Percent H | 3.98 | 3.95 |

Example 8

The complex salt of the compound of Example 5 is prepared with $B(C_6H_5)_4$:

$$[(C_6H_5)_3P-N-\underset{\underset{C_6H_5}{|}}{P}-N-P(C_6H_5)_3]^{++}[B(C_6H_5)_4]_2^-$$
$$\overset{CH_3}{|}\quad C_6H_5$$

To a solution of 4.56 g. of the phosphonium salt according to Example 5 in 30 ml. of ethyl alcohol is added dropwise a solution of 3.58 g. $K[B(C_6H_5)_4]$ in 30 ml. of ethyl alcohol. After 16 hours the precipitation is filtered off and freed from KBr by washing with water. Yield 5.3 g. (=77% of the theory); M.P. 172–175° C.

Analysis.—$C_{97}H_{83}N_2P_3B_2$:

|  | Calcd. | Found |
|---|---|---|
| Percent C | 84.39 | 85.09 |
| Percent H | 6.06 | 6.46 |

Example 9

$$[(C_6H_5)_3P-N-As(CH_3)_2]^+Br^-$$
$$\underset{C_6H_5}{|}$$

To a solution of 3.53 g. $(C_6H_5)_3P=NC_6H_5$ in 300 ml. of ether is added dropwise a solution of 1.85 g.

$$(CH_3)_2AsBr$$

in 50 ml. of ether. After 1 hour the precipitated white crystals are filtered off. The product is recrystallized from ethyl alcohol. Yield 3.82 g. (=71% of the theory); M.P. 194–198° C. (183–188° C. sintering).

Analysis.—$C_{26}H_{26}NPAsBr$:

|  | Calcd. | Found |
|---|---|---|
| Percent C | 58.01 | 57.33 |
| Percent H | 4.87 | 3.84 |
| Percent Br | 14.81 | 15.41 |
| Percent As | 13.92 | 13.22 |

Example 10

The complex salt of the compound of Example 9 is prepared with $HgBr_2$:

$$[(C_6H_5)_3P-N-As(CH_3)_2]^+[HgBr_3]^-$$
$$\underset{C_6H_5}{|}$$

To a solution of 5.38 g. of the phosphonium salt according to Example 9 in 30 ml. of ethyl alcohol is added dropwise a solution of 3.6 g. $HgBr_2$ in 50 ml. of ethyl alcohol. The reaction mixture is mixed with some ether and cooled. The precipitated crystals are filtered off. Yield 7.42 g. (=82% of the theory); M.P. 147–148° C.

Analysis.—$C_{26}H_{26}NPAsHgBr_3$:

|  | Calcd | Found |
|---|---|---|
| Percent Br | 26.67 | 25.63 |
| Percent Hg | 22.32 | 23.41 |

Example 11

The complex salt of the compound of Example 9 is prepared with $B(C_6H_5)_4$:

$$[(C_6H_5)_3-P-N-As(CH_3)_2]^+[B(C_6H_5)_4]^-$$
$$\underset{C_6H_4}{|}$$

To a solution of 5.38 g. of the phosphonium salt according to Example 9 in 30 ml. of ethyl alcohol is added dropwise a solution of 3.58 g. $K[B(C_6H_5)_4]$ in 20 ml. of ethyl alcohol. After 16 hours the white precipitation is filtered off and freed from KBr by washing with water. Yield 6.66 g. (=85.5% of the theory).

Example 12

The complex salt of the compound of Example 9 is prepared with $Cr(SCN)_4(NH_3)_2$:

$$[(C_6H_5)_3-P-N-As(CH_3)_2]^+[Cr(SCN)_4(NH_3)_2]^-$$
$$\underset{C_6H_5}{|}$$

To a solution of 5.38 g. of the phosphonium salt according to Example 9 in 30 ml. of ethyl alcohol is added dropwise a solution of 3.36 g. $NH_4[Cr(SCN)_4(NH_3)_2]$ in 60 ml. of ethyl alcohol. After cooling the reaction mixture the precipitated crystals are filtered off. Yield 4.66 g. (=60% of the theory).

Analysis.—$C_{30}H_{32}N_7PAsS_4Cr$:

|  | Calcd. | Found |
|---|---|---|
| Percent C | 47.24 | 48.76 |
| Percent H | 4.23 | 4.55 |

Example 13

$$[(C_6H_5)_3P-N-\underset{\underset{C_6H_5}{|}}{As}-N-P(C_6H_5)_3]^{++}2Br^-$$
$$\overset{CH_3}{|}\quad C_6H_5$$

To a solution of 3.53 g. $(C_6H_5)_3P=NC_6H_5$ in 300 ml. of ether is added dropwise a solution of 1.25 g. $CH_3AsBr_2$ in 50 ml. of ether. The precipitation is recrystallized in alcohol/ether. Yield 3.79 g. (=79% of the theory); M.P. 198–200° C.

Analysis.—$C_{49}H_{43}P_2N_2AsBr_2$:

|  | Calcd. | Found |
|---|---|---|
| Percent N | 2.93 | 3.35 |
| Percent Br | 16.71 | 16.54 |

Example 14

$$[(C_6H_5)_3P-N-\langle\phantom{X}\rangle-N-P(C_6H_5)_3]^{++}2Br^-$$
$$\underset{Si(CH_3)_3}{|}\quad\underset{Si(CH_3)_3}{|}$$

To a solution of 1.25 g.

$$(C_6H_5)_3P=N-\langle\phantom{X}\rangle-N=P(C_6H_5)_3$$

in 50 ml. of dioxane is added dropwise a solution of 0.61 g. $(CH_3)_3SiBr$ in 20 ml. of dioxane. Yield 1.8 g. crude product; recrystallization in methanol yields 1.0 g. of pure product; M.P. 277–279° C.

Analysis.—$C_{48}H_{52}N_2P_2Si_2Br_2$:

|  | Calcd. | Found |
|---|---|---|
| Percent N | 2.99 | 3.3 |
| Percent Br | 17.14 | 17.81 |

Example 15

$$[-N-\langle\phantom{X}\rangle-N-\underset{\underset{P(C_6H_5)_3}{|}}{As}-N-\langle\phantom{X}\rangle-N-As-]^{n+4n}Br^-$$
$$\underset{P(C_6H_5)_3}{|}\quad\underset{P(C_6H_5)_3}{|}\quad\overset{CH_3}{|}\quad\underset{P(C_6H_5)_3}{|}\quad\overset{H_3C}{|}$$

To a solution of 1.25 g.

$$(C_6H_5)_3P=N-\langle\phantom{X}\rangle-N=P(C_6H_5)_3$$

in 50 ml. of dioxane is added dropwise a solution of 0.5 g. $CH_3AsBr_2$ in 10 ml. of dioxane. The reaction mixture becomes instantaneously turbid and a black oil precipitates. The dioxane is removed in vacuum, the remaining oil dissolved in alcohol and by addition of ether a crystalline product is precipitated. Yield 200 mg. (=11% of the theory); M.P. 272–280° C.

*Example 16*

$$[-N-\underset{P(C_6H_5)_3}{\overset{}{\bigcirc}}-N-\underset{P(C_6H_5)_3}{\overset{CH_3}{\underset{|}{P}}}-N-\underset{P(C_6H_5)_3}{\overset{}{\bigcirc}}-N-\underset{P(C_6H_5)_3}{\overset{H_3C}{\underset{|}{P}}}-]^{n+4n}Br^-$$

To a solution of 1.05 g.

$$(C_6H_5)_3P=N-\bigcirc-N=P(C_6H_5)_3$$

in 80 ml. of dioxane is added dropwise a solution of 0.35 g. $CH_3PBr_2$ in 30 ml. of dioxane. The reaction is exothermic. A flocky brown product precipitates. The purification is achieved by dissolving in alcohol and precipitating with ether. Yield 1.2 g. (=86% of the theory); M.P. 270–270.5° C.

When the experimental examples are analyzed it will be seen that they are of one of the three following general formulas:

(1) $$[(R_3P-N-)_m MR_{v-m}]^{m+} mX^-$$
$$\qquad\qquad\quad |$$
$$\qquad\qquad\quad R'$$

wherein R, M and X are as defined hereinabove, R' is defined as hydrogen or a hydrocarbon radical, $v$ is the valence of M and $m$ is an integer not greater than $v$;

(2) $$[R_3P-N-R''-N-PR_3]^{++}2X^-$$
$$\qquad\quad |\qquad\qquad |$$
$$\qquad MR_{v-1}\quad MR_{v-1}$$

wherein R, R'', M and X are as defined hereinabove and $v$ is the valence of M; and, (3) $$[-N-R''-N-M-N-R''-N-M-]^{n+4n}X^-$$
$$\quad |\qquad\quad |\qquad |\qquad\quad |\qquad |$$
$$\ PR_3\quad PR_3\ R_{v-2}\ PR_3\quad PR_3\ R_{v-2}$$

wherein R, R'', M and X are as defined hereinabove, $v$ is the valence of M and $n$ is an integer.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for preparing phosphonium salts comprising reacting phosphinimines of the formula $R_3P=NR'$ wherein R is selected from the class consisting of hydrocarbon, R'''S, R'''O and hydrocarbonamino radicals free of aliphatic unsaturation and having not more than 18 carbon atoms in the hydrocarbon groups, and R' is selected from the class consisting of hydrogen, hydrocarbon radicals free of aliphatic unsaturation and having not more than 18 carbon atoms and radicals of the formula —R''—N=PR_3 wherein R is as described hereinabove and R'' and R''' are hydrocarbon radicals free of aliphatic unsaturation and having not more than 18 carbon atoms, with quaternizing compounds of the formula $$R_a(A)_b MX_{\frac{v-a-2b}{c}}$$

wherein R is as defined hereinabove, A is selected from oxygen and sulfur, M is selected from the class consisting of polyvalent metals, phosphorus, silicon and boron, X is an acid anion, $a$ is selected from 0 and integers, $b$ is selected from 0 and 1, $c$ is the base value of the acid anion X, $v$ is the actual valence of the element M and $$\frac{v-a-2b}{c}$$

is an integer.

2. A process of claim 1 wherein the reaction is carried out in the presence of a solvent, X is a halogen and at least one X is not fluorine.

3. A process of reacting phosphonium salts of claim 1 with salts selected from the class consisting of metal and ammonium salts.

4. A process for preparing $$[(C_6H_5)_3P-N-Si(CH_3)_3]^+Br^-$$
$$\qquad\qquad\quad |$$
$$\qquad\qquad\ C_6H_5$$

comprising reacting in the presence of a solvent $$(C_6H_5)_3P=NC_6H_5$$

with $BrSi(CH_3)_3$.

5. A process for preparing $$[(C_6H_5)_3P-N-Si(CH_3)_3]^+[HgBr_3]^-$$
$$\qquad\qquad\quad |$$
$$\qquad\qquad\ C_6H_5$$

comprising reacting in the presence of a solvent the phosphonium product salt of claim 4 with $HgBr_2$.

6. A process for preparing $$[(C_6H_5)_3P-N-\overset{CH_3}{\underset{|}{P}}-N-P(C_6H_5)_3]^{++}2Br^-$$
$$\qquad\qquad\quad |\qquad\quad |$$
$$\qquad\qquad\ C_6H_5\ C_6H_5$$

comprising reacting in the presence of a solvent $$(C_6H_5)_3P=NC_6H_5$$

with $CH_3PBr_2$.

7. A process for preparing $$[(C_6H_5)_3P-N-As(CH_3)_2]^+Br^-$$
$$\qquad\qquad\quad |$$
$$\qquad\qquad\ C_6H_5$$

comprising reacting in the presence of a solvent $$(C_6H_5)_3P=NC_6H_5$$

with $(CH_3)_2AsBr$.

8. A process of preparing a solid polymer having recurring structural units of the formula $$[-N-\underset{P(C_6H_5)_3}{\overset{}{\bigcirc}}-N-\underset{P(C_6H_5)_3}{\overset{CH_3}{\underset{|}{P}}}-N-\underset{P(C_6H_5)_3}{\overset{}{\bigcirc}}-N-\underset{P(C_6H_5)_3}{\overset{H_3C}{\underset{|}{P}}}-]^{n+4n}Br^-$$

wherein $n$ is an integer greater than 1 and indicative of the length of the polymer chain, comprising reacting in the presence of a solvent $$(C_6H_5)_3P=N-\bigcirc-N=P(C_6H_5)_3$$

with $CH_3PBr_2$.

9. A phosphonium salt selected from compounds of the formulas (1) $$[(R_3P-N-)_m MR_{v-m}]^{m+} mX^-$$
$$\qquad\qquad\quad |$$
$$\qquad\qquad\quad R'$$

and (2) $$[R_3P-N-R''-N-PR_3]^{++}2X^-$$
$$\qquad\quad |\qquad\qquad |$$
$$\qquad MR_{v-1}\quad MR_{v-1}$$

wherein R is selected from the class consisting of hydrocarbon, R'''' S, R'''' O and hydrocarbonamino radicals free of aliphatic unsaturation and having not more than 18 carbon atoms in the hydrocarbon groups, R' is selected from the class consisting of hydrogen and hydrocarbon radicals free of aliphatic unsaturation and having not more than 18 carbon atoms, R'' and R''' are hydrocarbon radicals free of aliphatic unsaturation and having not more than 18 carbon atoms, M is selected from the class consisting of polyvalent metals, phosphorus, silicon and boron, X is an acid anion, $v$ is the valence of M, $m$ is an integer from 1 to $v$.

10.

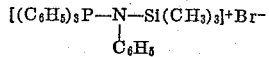

11.

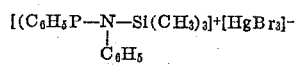

12.

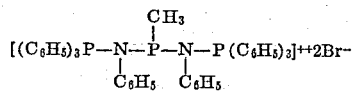

13.

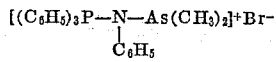

14. A solid polymeric composition having a melting point of about 270–270.05° C. and recurring structural units of the formula

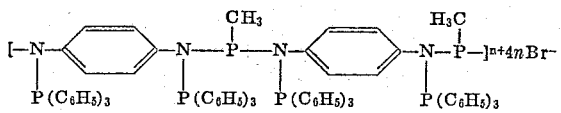

wherein $n$ is an integer greater than 1 and indicative of the length of the polymer chain.

15. A process of claim 1 wherein all of said hydrocarbon groups are free of aliphatic unsaturation, said metals are selected from the class consisting of Be, Mg, Ca, Zn, Cd, Hg, Al, Ga, Zr, Ge, Sn, As, Sb, Bi and Te, and said acid anions are selected from the class consisting of halides, sulfates, nitrates, phosphates, cyanides, cyanates, thiocyanates, chlorates, perchlorates, sulfides, acetates, laurates and oleates.

16. A phosphonium salt of claim 9 wherein all of said hydrocarbon groups are free of aliphatic unsaturation, said metals are selected from the class consisting of Be, Mg, Ca, Zn, Cd, Hg, Al, Ga, Zr, Ge, Sn, As, Sb, Bi and Te, and said acid anions are selected from the class consisting of halides, sulfates, nitrates, phosphates, cyanides, cyanates, thiocyanates, chlorates, perchlorates, sulfides, acetates, laurates and oleates.

17. A polymeric phosphonium salt having recurring structural units of the formula

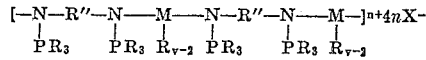

wherein R is selected from the class consisting of hydrocarbon, R'''S, R'''O and hydrocarbonamino radicals free of aliphatic unsaturation and having not more than 18 carbon atoms in the hydrocarbon group, R'' and R''' are hydrocarbon radicals free of aliphatic unsaturation and having not more than 18 carbon atoms, M is selected from the class consisting of polyvalent metals, phosphorus, silicon and boron, X is an acid anion, $v$ is the valence of M, and $n$ is an integer greater than 1 and indicative of the length of the polymer chain.

References Cited by the Examiner

Horner et al.: Justus Liebigs Annalen der Chem., vol. 627, pages 142–162 (1959).

Sheldon et al.: Journal American Chemical Society, vol. 80, pages 2117–20 (1958).

Appel et al.: Chem. Ber., vol. 93, pages 405–11 (1960).

WILLIAM H. SHORT, *Primary Examiner.*

H. N. BURSTEIN, *Examiner.*